US006175371B1

United States Patent
Schoulz et al.

(10) Patent No.: US 6,175,371 B1
(45) Date of Patent: Jan. 16, 2001

(54) PROCESS FOR TRANSFORMING IMAGES INTO STEREOSCOPIC IMAGES, IMAGES AND IMAGE SERIES OBTAINED BY THIS PROCESS

(75) Inventors: Philippe Schoulz, 14 Rue Ducoüédic, Paris; Keith Mac Donald, Grigny, both of (FR)

(73) Assignee: Philippe Schoulz, Paris (FR)

(*) Notice: Under 35 U.S.C. 154(b), the term of this patent shall be extended for 0 days.

(21) Appl. No.: 08/973,671

(22) PCT Filed: May 23, 1996

(86) PCT No.: PCT/FR96/00769

§ 371 Date: Mar. 5, 1998

§ 102(e) Date: Mar. 5, 1998

(87) PCT Pub. No.: WO96/38753

PCT Pub. Date: Dec. 5, 1996

(30) Foreign Application Priority Data

Jun. 2, 1995 (FR) .................................... 95 06586
Sep. 4, 1995 (FR) .................................... 95 10336

(51) Int. Cl.[7] .................................................. G06K 9/32
(52) U.S. Cl. ........................................ 345/435; 382/296
(58) Field of Search ........................... 359/464; 345/419, 345/422, 435; 382/276, 294–296

(56) References Cited

U.S. PATENT DOCUMENTS

| 4,558,359 | * | 12/1985 | Kuperman et al. | 348/44 |
| 5,337,096 | * | 8/1994 | Qu et al. | 353/7 |
| 5,379,369 | * | 1/1995 | Komma et al. | 345/419 |
| 5,469,536 | * | 11/1995 | Blank | 345/431 |

FOREIGN PATENT DOCUMENTS

| 2261789 | 5/1993 | (GB) . |
| WO 85/04494 | 10/1985 | (WO) . |
| WO 88/04804 | 6/1988 | (WO) . |

OTHER PUBLICATIONS

Yamaguchi et al. 'Stereoscopic Video Movie Camera "3D–CAM"'. IEEE 1988 International Conference on Consumer Electronics, Rosemont, Jun. 8–10, 1988. pp. 178–179.*

* cited by examiner

Primary Examiner—Mark Zimmerman
Assistant Examiner—Philip H. Stevenson
(74) Attorney, Agent, or Firm—Alston & Bird LLP

(57) ABSTRACT

The present invention relates to a method of transforming images, in particular photographs, into stereoscopic images, and also to images, and visual or audiovisual programs including sequences of images obtained by said method, and in particular to motion pictures and video games. The invention is achieved by:

separating an image background into complementary color components, that are advantageously red, blue, and green;

displacing at least one of the color components relative to the others, advantageously by shifting two color components through small amplitudes in opposite directions with the third color component, typically green, remaining stationary, or by rotating two color components in opposite directions through small amplitudes, with the third color component remaining stationary; and superposing an image that forms a foreground for the image.

16 Claims, 8 Drawing Sheets

PROCESS FOR TRANSFORMING IMAGES INTO STEREOSCOPIC IMAGES, IMAGES AND IMAGE SERIES OBTAINED BY THIS PROCESS

The present invention relates to a method of transforming images, in particular photographs, into stereoscopic images, and also to images and visual or audiovisual programs including sequences of images obtained by said method, in particular to motion pictures on film stock or magnetic media, and also to video games.

BACKGROUND OF THE INVENTION

For many years, the depth effect of stereoscopic images has exerted great fascination on viewers. This effect is obtained by the left eye seeing an image that is horizontally offset from the image seen by the right eye. When looking directly at three-dimensional objects, holograms, or 3D images provided with lens arrays, the offset between the images seen in each eye is due to the physical offset between the optical axes of the eyes. Unfortunately, those techniques cannot be implemented for looking at printed images suitable for being widely distributed. Other stereoscopic systems use a first image for the left eye which is made invisible to the right eye by first masking means, and a second image for the right eye which is made invisible to the left eye by second masking means.

In stereoscopic slide viewers, which are typically fitted with two identical converging lenses forming two eyepieces, an opaque partition lying in the sagittal plane between the eyes and the slides acts as masking means by preventing the left eye from seeing the image for the right eye, and vice versa.

The physical offset of the two images of the slide requires a viewer that is relatively complex and expensive in order to look at the stereoscopic image, which viewer must also be adapted to the format of the slides to be looked at. Since there is no single image, there is no simple way of looking at a two-dimensional image (without depth).

In another type of known device, masking means are provided by spectacles comprising a first polarizing filter having a first polarization placed in front of the left eye and a second polarizing filter having a second polarization that is crossed relative to the first placed in front of the right eye, thereby enabling the two eyes to see different images either simultaneously or alternately.

Polarizing filters can be replaced by shutters, e.g. liquid crystal shutters, placed in front of the eyes, with a first shutter being transparent when the second is opaque and vice versa, with the shutter cycles lasting, substantially one-thirtieth of a second, for example. To enable stereoscopic images to be seen, a computer system monitor displays images for the left eye interlaced with images for the right eye. Equipment that is complex and expensive is needed to see such stereoscopic images.

In the above cases, from the moment the pictures are taken, it is necessary to acquire two images: respectively for the left eye and for the right eye. Making a stereoscopic image from a plane image, e.g. a conventional photograph, is impossible, or at any rate extremely complex.

Finally, in known manner, the masking means may comprise a red filter placed in front of the left eye and a blue filter placed in front of the right eye. The image to be looked at comprises either a blue image for the right eye superposed on a red image for the left eye, thereby generating a good depth effect, or else a color image in which the foreground subject has red and blue fringes of considerable width on its left and right sides, thereby generating a moderate depth effect. The quality of such images is insufficient to enable the plane images (i.e. without any depth effect) to be acceptable when looked at without using colored spectacles.

U.S. Pat. No. 4,558,359 describes a method of transforming monochrome images into stereoscopic color images by coloring the image and by adding colored elements which are offset relative to the original image.

The Applicants have discovered that stereoscopic images are looked at mainly without using spectacles, particularly when they are being looked at for selection purposes. With the exception of three-dimensional images covered in lens arrays, which technique and high price have not enabled widespread distribution, present techniques do not make it easy to look at images without using additional equipment, in particular when selecting images to be looked at and/or purchased.

OBJECTS AND SUMMARY OF THE INVENTION

Consequently, an object of the present invention is to provide stereoscopic images that reproduce a three-dimensional effect by using means placed in front of the eyes for selecting or separating images for the left eye and for the right eye, while also making it easy to look at the image without any image separating means and with minimal reduction in the quality of the image as perceived when looked at directly (but without the three-dimensional effect).

Another object of the present invention is to provide such images that are suitable for being printed or for being viewed on any known display means.

Another object of the present invention is to provide such stereoscopic images requiring means for selecting or separating images for the left eye and for the right eye that are simple and cheap.

Another object of the present invention is to provide video games or a motion picture on any possible medium and including a sequence of such stereoscopic images.

Another object of the present invention is to provide a method of transforming conventional two-dimensional images (having no depth effect), in particular photographs, into stereoscopic images.

Another object of the present invention is to provide such a method that is simple, quick to implement, and cheap.

Another object of the present invention is to provide such a method enabling stereoscopic images to be obtained by creating and/or transforming two-dimensional images (having no depth effect) by means of a graphics editor of known type.

According to the invention, these objects are achieved by:

separating a background of the image into color components of complementary colors, advantageously red, blue, and green;

displacing at least one of the color components relative to the others, advantageously by displacing two color components in opposite directions through a small amplitude, with the third color component, typically green, remaining stationary; and superposing an image that forms a foreground of the image.

In a first implementation, the relative displacement is horizontal or substantially horizontal translation.

In a second implementation, the relative displacement is rotation.

In a third implementation, the relative displacement corresponds to translation combined with rotation.

The Applicants have discovered that horizontal displacement of the color components relative to one another can be combined with and/or replaced by relative rotation of at least one of the color components relative to the others. When implementing the method of the present invention, such rotation serves to emphasize the three-dimensional effect and/or to reduce possible horizontal displacement of the color components relative to one another, thereby minimizing degradation in the image perceived when it is looked at directly (without the 3D effect). In most cases, for rotations of small amplitude, the offset is not perceptible to the naked eye while nevertheless giving rise to three-dimensional images being perceived when looking through colored spectacles. In addition, rotating the color components makes it possible to improve perception of a continuous transition between various planes of the three-dimensional image.

The stereoscopic image of the invention is looked at through colored spectacles whose colors correspond to the complementary colors that are displaced in the background of the image (typically a red filter in front of the left eye and a blue filter in front of the right eye, or vice versa). Nevertheless, it should be understood that treatment using color components other than red and blue, together with appropriate filters, could be performed without going beyond the ambit of the present invention.

The main object of the invention is to provide a method of transforming images into stereoscopic images, the method comprising the following steps:

a) defining pixels forming a background;

b) defining pixels forming a foreground;

c) temporarily saving the pixels that form a foreground;

d) separating an image including at least background-forming pixels into complementary color components;

e) displacing at least one of the color components relative to the other components; and f) superposing the temporarily saved foreground-forming images on the image having at least one of its color components subjected to displacement.

The invention also provides a method wherein the relative displacement of the color components comprises rotation of at least one of the color components relative to the other components through a non-zero angle α of less than 2°.

The invention also provides a method wherein digitized images are treated and the angle α lies in the range 0.001° to 0.8°.

The invention also provides a method wherein the angle α is less than or equal to 0.4°.

The invention also provides a method wherein the relative displacement of colors includes translation of at least one of the color components relative to the other components.

The invention also provides a method wherein digitized images are treated, and wherein the relative translation of the color components is horizontal or substantially horizontal, and has an amplitude lying in the range 0.25 pixels to 15 pixels.

The invention also provides a method wherein the horizontal or substantially horizontal translation is less than or equal to 3 pixels.

The invention also provides a method making use of a computer system, and wherein step c) consists in selecting and copying foreground-forming pixels in particular into a clipboard or a file.

The invention also provides a method including a step of cropping the ends of the image.

The invention also provides a method wherein step d) of separating the image including the background into complementary color components comprises separation into red, green, and blue components.

The invention also provides a method wherein rotation of the same amplitude is performed in opposite directions on the red and blue components of the image including the background.

The invention also provides a method wherein same amplitude translation in opposite directions is performed on the red and blue components of the image including the background.

The invention also provides a method of transforming a motion picture into a stereoscopic motion picture, the method including the steps of acquiring the images of the motion picture and steps of transforming the images into stereoscopic images according to the invention.

The invention also provides a method including a step of automatically detecting foregrounds or backgrounds in the images to be transformed.

The invention also provides a stereoscopic image, obtained by the method according to the invention.

The invention also provides an image synthesized by four-color subtractive printing using yellow, cyan, magenta, and black inks.

BRIEF DESCRIPTION OF THE DRAWINGS

The invention will be better understood from the following description and the accompanying figures given as non-limiting examples, and in which:

In FIGS. 1 to 17, the same references are used to designate the same elements. For reasons of clarity, the shifts between layers are exaggerated in FIGS. 5 to 10 and the rotations between layers are exaggerated in FIGS. 13 to 17.

MORE DETAILED DESCRIPTION

Figure 1:
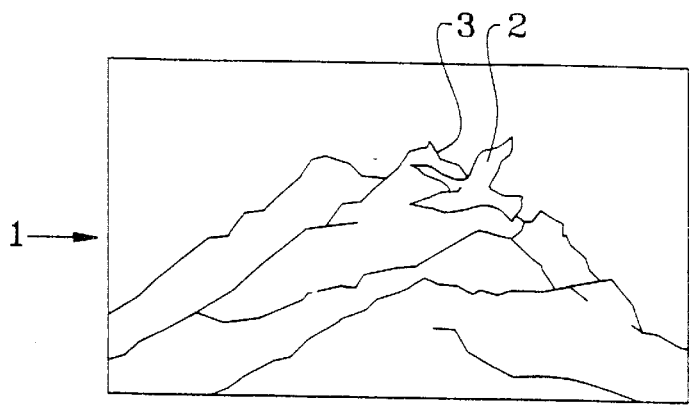
FIG. 1 is a diagrammatic view of an example of a two-dimensional image to which it is desired to add a three-dimensional effect.

In FIG. 1, there can be seen an image 1 showing a bird 2 flying in the foreground and mountains 3 in the background. In the example shown in FIGS. 2 to 10, a 3D effect is given to the image by detaching the bird 2 which will appear to be flying in front of the mountains 3. Naturally this is merely a non-limiting example, and the method of the present invention applies to any subject. However, other information concerning image depth, e.g. such as complying with the rules of perceptive, or having an image that is slightly less sharp, or that is mistier and/or bluer for a remote background all accentuate the perception of a three-dimensional image by the human brain.

The image 1 of FIG. 1 may be a matrix image (a "bit map" in computer terminology) at resolution that is at least as good as that of the desired stereoscopic image. For example, it may be an image created by means of software for creating and editing bit-map graphics images, a digitized photograph, or vector graphics converted into a bit map.

In the example described below, we describe a first implementation of the method of the present invention as implemented on a computer system. Nevertheless, other methods, e.g. such as optical filtering and manually displacing films corresponding to a plurality of color components, could also be used without going beyond the ambit of the present invention.

Figure 2:
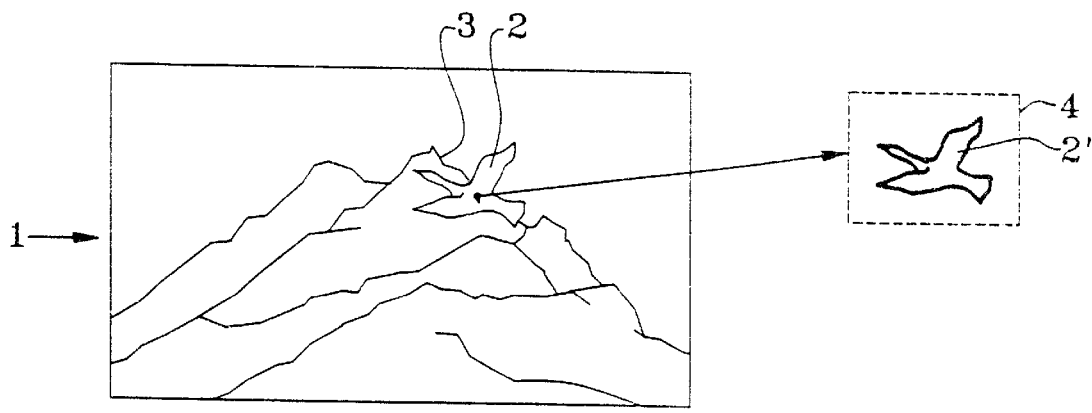
FIG. 2 is a diagrammatic view showing a first step in the method of the present invention.

In FIG. 2, the bird 2 that is to form the foreground is selected, e.g. by being blocked out. This may be done by means of a "cut" function that removes the bird from the image 1 of FIG. 2, or by a "copy" function that places a copy 2' in a clipboard 4 or in a file for subsequent use. It is also possible to select by means of an "airbrush" tool to avoid a sharp transition between planes in the three-dimensional image. In a variant, it is quite possible to start directly with the background image, and add the foreground by a "paste" operation during the step illustrated in FIG. 10. Thus, for example, it would be quite possible to make a montage of a photograph representing a mountain scene 3 and then add a bird 2' that had been photographed or drawn separately.

Figure 3:
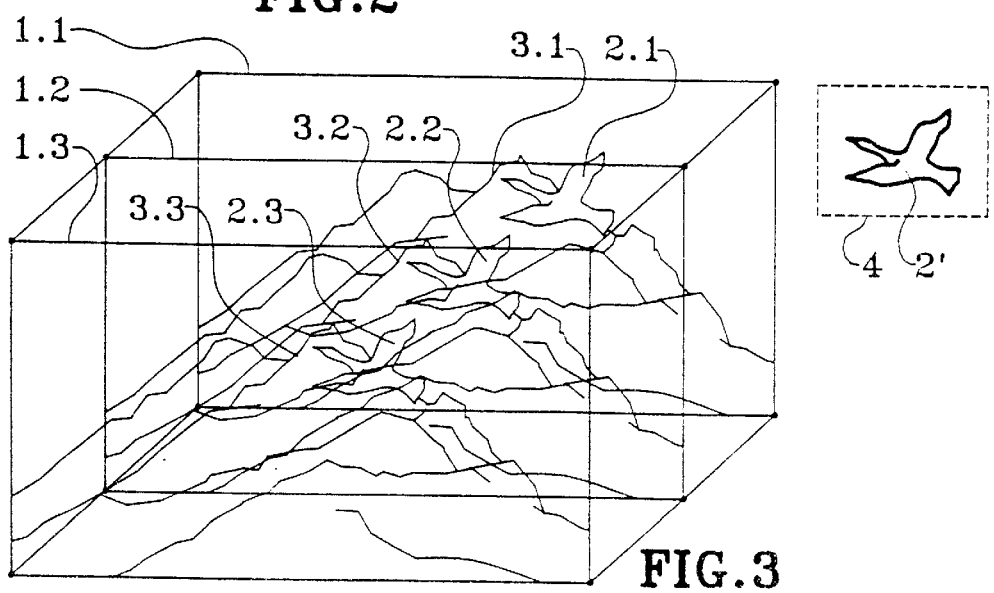
FIG. 3 is a diagrammatic view of a second step in a first implementation of the method of the present invention.

In FIG. 3, the image 1 is separated into complementary colors. For example, the image 1 is separated into a red component 1.1, a green component 1.2, and a blue component 1.3 which are symbolized as three superposed planes in FIGS. 3 to 8. It should be observed that the bird 2 of the image 1 is likewise subjected to separation into complementary color components, whereas its copy 2' in the clipboard 4 or in a temporary file is not modified.

Figure 4:
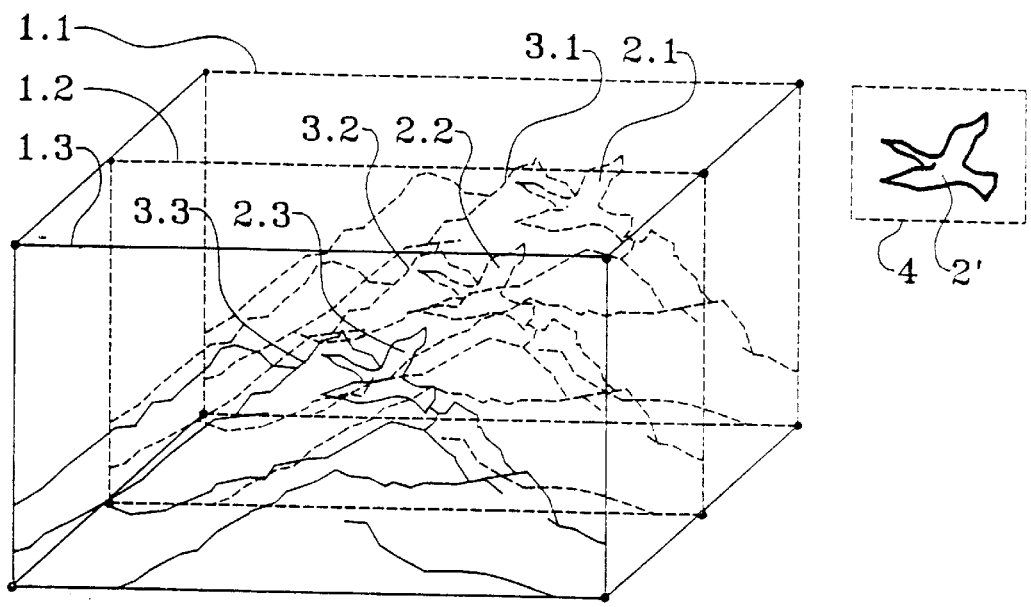
FIG. 4 is a diagrammatic view showing a third step in the first implementation of the method of the present invention.

In FIG. 4, the blue component 1.3 had been selected. In software for retouching bit-map graphics images, selection makes it possible to change selected elements without affecting the remainder of the image. The non-selected color components of the image are represented by dashed lined in FIGS. 4 to 7 and 12 to 15.

Figure 5:
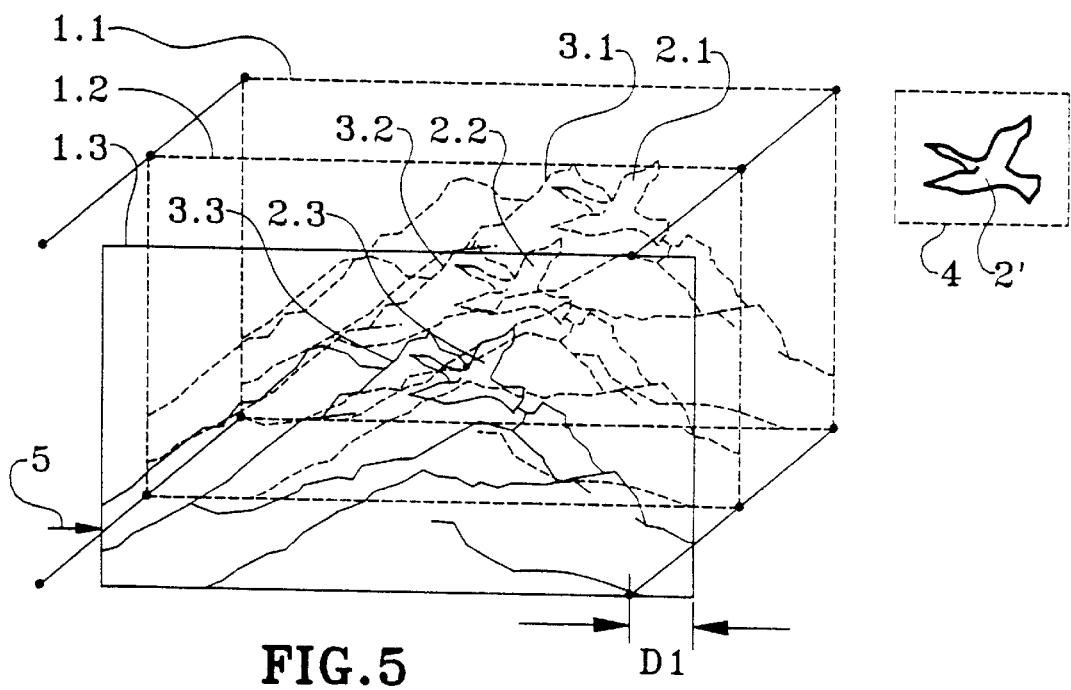
FIG. 5 is a diagrammatic view of a fourth step in the first implementation of the method of the present invention.

In FIG. 5, the component 1.3 of the image 1 is shifted through a small amplitude D1 to the right as symbolized by arrow 5. The shift D1 must nevertheless be large enough to be visible in the final image, possibly with a magnifying glass. Thus, when the resolution at which the stereoscopic image is printed or displayed is low, it is necessary for the shift D1 to be greater. By way of example, the shift D1 may lie in the range 0.01 to 15 pixels, and preferably lies in the range 0.05 to 10 pixels, advantageously being in the range 0.25 to 5 pixels, and being equal to 0.25, 0.5, 1, 2, 3, or 4 pixels. The optimum shift that gives a good three-dimensional effect but that is of little consequence when the image is looked at without spectacles is selected directly as a function of the size of the final image. Excellent results have been obtained for A4 format (210 mm×297 mm) with a shift of 0.5 pixels, and for projection onto a large screen having a width of approximately 10 meters (m), using a shift of 0.02 pixels. A shift of 0.25 pixels is obtained, for example, by enlarging the image ("zoom 400%" function), shifting it through an amplitude of 1 pixel, and reducing the resulting image by a factor matching the enlargement factor ("zoom 25%" function). This number of pixels corresponds to the number of pixels in the digitized image displayed in true color, e.g. as encoded on 24 bits. Naturally, when printing or displaying dot-based images, in order to provide perceptible colored fringes, left and right borders of parts of the image may need to be given a number of pixels that is considerably greater than the dot pitch. Keeping the shift amplitude D1 small serves to minimize its impact on the final stereoscopic image when it is looked at without using colored spectacles.

Figure 6:
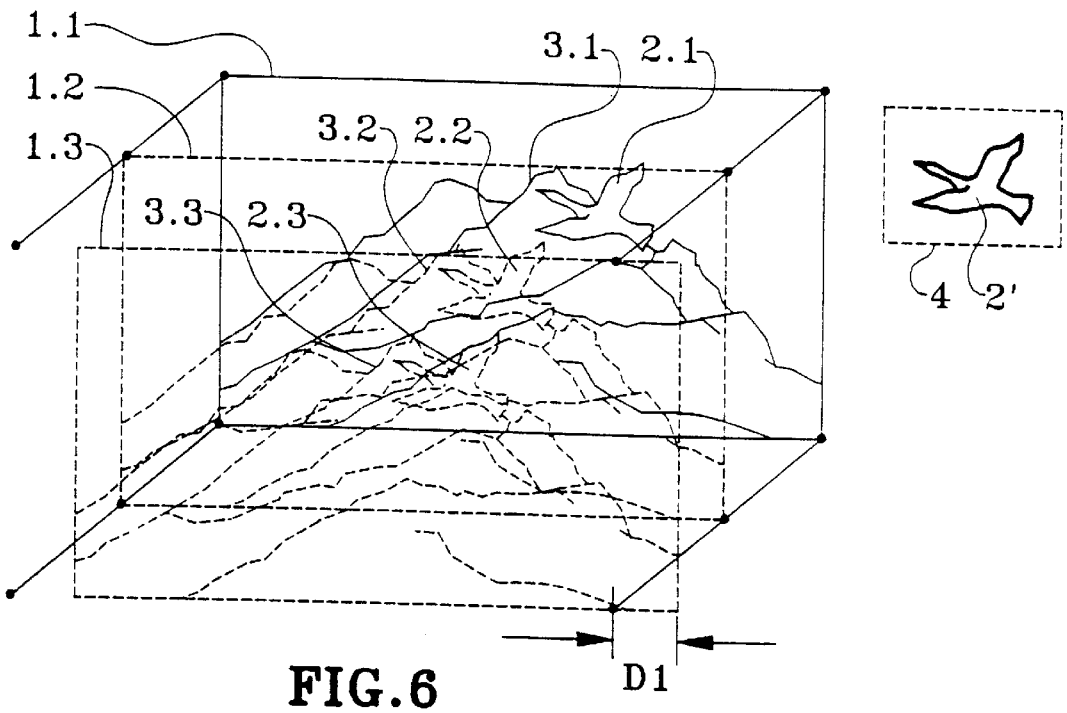
FIG. 6 is a diagrammatic view of a fifth step in the first implementation of the method of the present invention.

In FIG. 6, the blue component 1.3 of the image 1 has been deselected and the red component 1.1 of the image has been selected.

Figure 7:
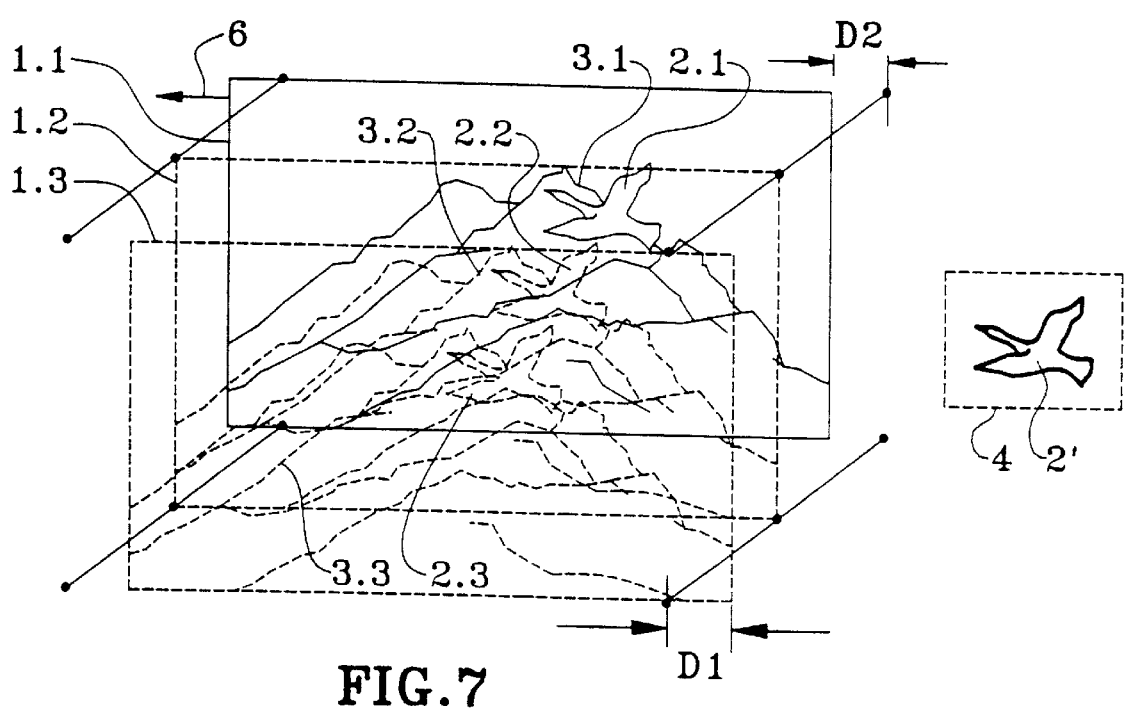
FIG. 7 is a diagrammatic view of a sixth step in the first implementation of the method of the present invention.

In FIG. 7, the red component 1.1 is shifted to the left as represented by arrow 6 through an amplitude D2 which is advantageously equal to the amplitude D1 of the right shift of the blue component 1.3

Figure 8:
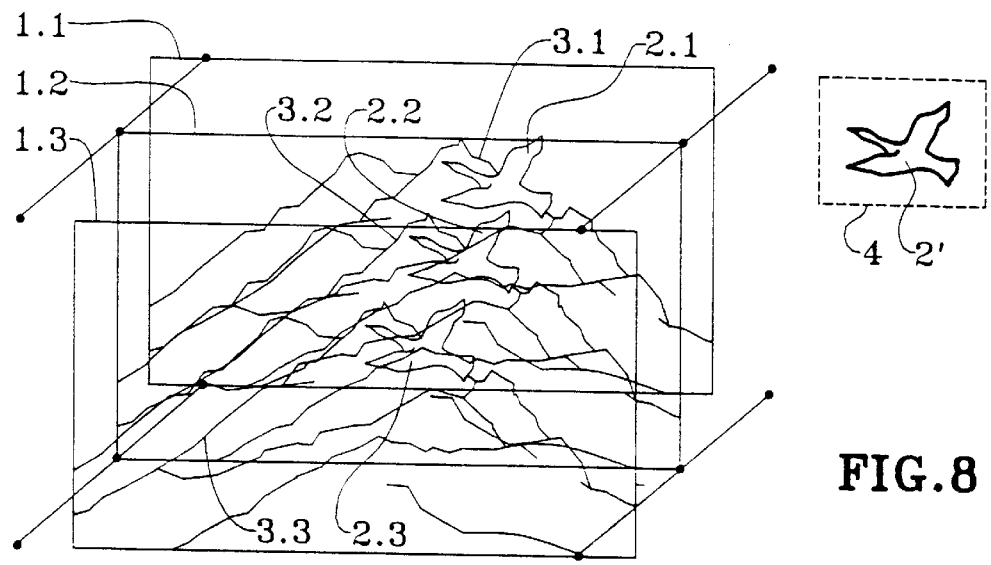
FIG. 8 is a diagrammatic view of a seventh step in the first implementation of the method of the present invention.
Figure 9:
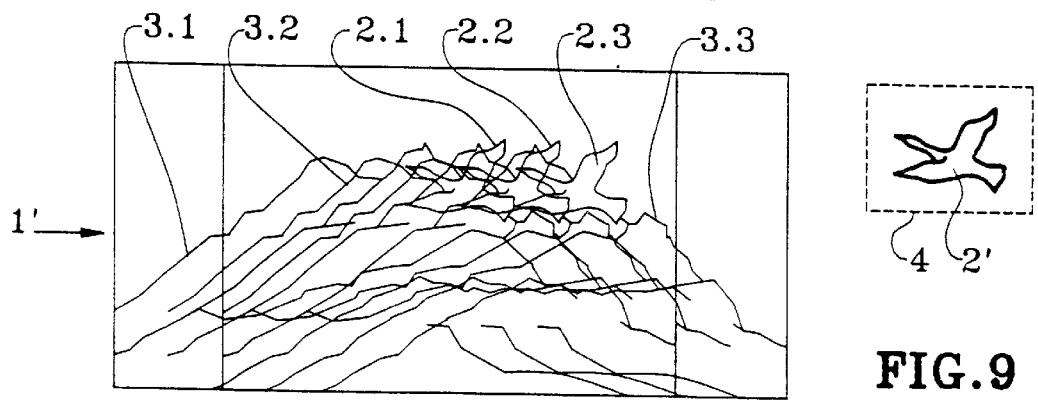
FIG. 9 is a diagrammatic view of an eighth step in the first implementation of the method of the present invention.

In FIG. 8 the red component 1.1 has been deselected and it can be seen that the green component 1.2 of the image has remained stationary, whereas the red component 1.1 has been shifted to the left and the blue component 1.3 has been shifted to the right. FIG. 9 shows the resulting image 1' corresponding to synthesis by additive superposition of the components 1.1, 1.2, and 1.3. In this image, the red component 3.1, the green component 3.2, and the blue component 3.3 of the mountain 3 are not exactly superposed. On the contrary, the left-hand side of the mountain has a red fringe corresponding to the component 3.1 of the image of the mountain 3. The right side of the mountain 3 is provided with a blue fringe corresponding to the component 3.3 of the image of the mountain. The same applies to the image 2 of the bird whose red, green, and blue components 2.1, 2.2, and 2.3 are not exactly superposed.

Figure 10:
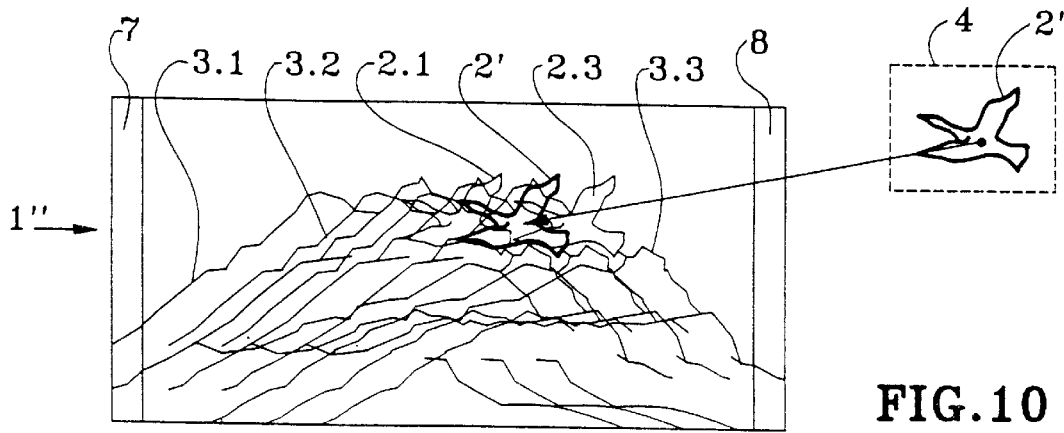
FIG. 10 is a diagrammatic view of a ninth step in the first implementation of a method of the present invention.

In FIG. 10, the duck 2' is pasted substantially on the location of the green component 2.2 of the image of the duck 2. Pasting is advantageously performed without transparency, i.e. the image 2' completely masks the image 2.2, thereby leading to multiple planes that are clearly separate. However, peripheral fringes corresponding to the components 2.1 and 2.3 of the duck remain. In a variant, multiple pasting operations are performed that are opaque or that have, for example, 20%, 30%, 40%, 50%, 70% or 90% transparency. By way of example, 2 to 10 successive superposed pasting operations are performed. Advantageously, the left edge 7 and the right edge 8 of the image are removed so as to eliminate any colored fringes that do not contribute to the three-dimensional effect. In a variant, a first image is printed comprising at least one background whose color components have been subjected to the above-specified shifts. The first image may also include foreground-forming images 2'. A second image that has not been subjected to shifting, e.g. a piece of a photographic print, is drawn or physically pasted on the first printed image. Surprisingly, during stereoscopic observation with colored spectacles, the second image forms a foreground that gives the illusion of lying in front of the background of the first image with a striking depth effect.

It should be observed that in certain images, depending on the colors of the subjects photographed, inverted blue and red color fringes can be seen on the foreground and/or background images.

There follows a description given with reference to FIGS. 1, 2, and 11 to 17 of a second implementation of the method of the present invention.

In FIG. 1, there can be seen an image 1 showing a bird 2 flying in the foreground and mountains 3 in the background. In the example shown in FIGS. 11 to 17, a 3D effect is given to the image by detaching the bird 2 which will appear to be flying in front of the mountains 3. Naturally this is merely a non-limiting example, and the method of the present invention applies to any subject. However, other information concerning image depth, e.g. such as complying with the rules of perceptive, or having an image that is slightly less sharp, or that is mistier and/or bluer for a remote background all accentuate the perception of a three-dimensional image by the human brain.

The image 1 of FIG. 1 may be a matrix image (a "bit map" in computer terminology) at resolution that is at least as good as that of the desired stereoscopic image. For example, it may be an image created by means of software for creating and editing bit-map graphics images, a digitized photograph, or vector graphics converted into a bit map.

In the example described below, we describe a preferred implementation of the method of the present invention as implemented on a computer system. Nevertheless, other methods, e.g. such as optical filtering and manually displacing films corresponding to a plurality of color components could also be used without going beyond the ambit of the present invention.

In FIG. 2, the bird 2 that is to form the foreground is selected, e.g. by being blocked out. This may be done by means of a "cut" function that removes the bird from the image 1 of FIG. 2, or by a "copy" function that places a copy 2' in a clipboard 4 or in a file for subsequent use. It is also possible to select by means of an "airbrush" tool to avoid a sharp transition between planes in the three-dimensional image and enabling selection to be performed progressively so as to model volumes, i.e. so as to impart an impression of progressive three-dimensional shaping giving spectacular results with rounded subjects such as spheres, cylinders, vases, receptacles, the human body, etc. . . . In a variant, it is quite possible to start directly with the background image, and add the foreground by a "paste" operation during the step illustrated in FIG. 17. Thus, for example, it would be quite possible to make a montage of a photograph representing a mountain scene 3 and then add a bird 2' that had been photographed or drawn separately.

Figure 11:
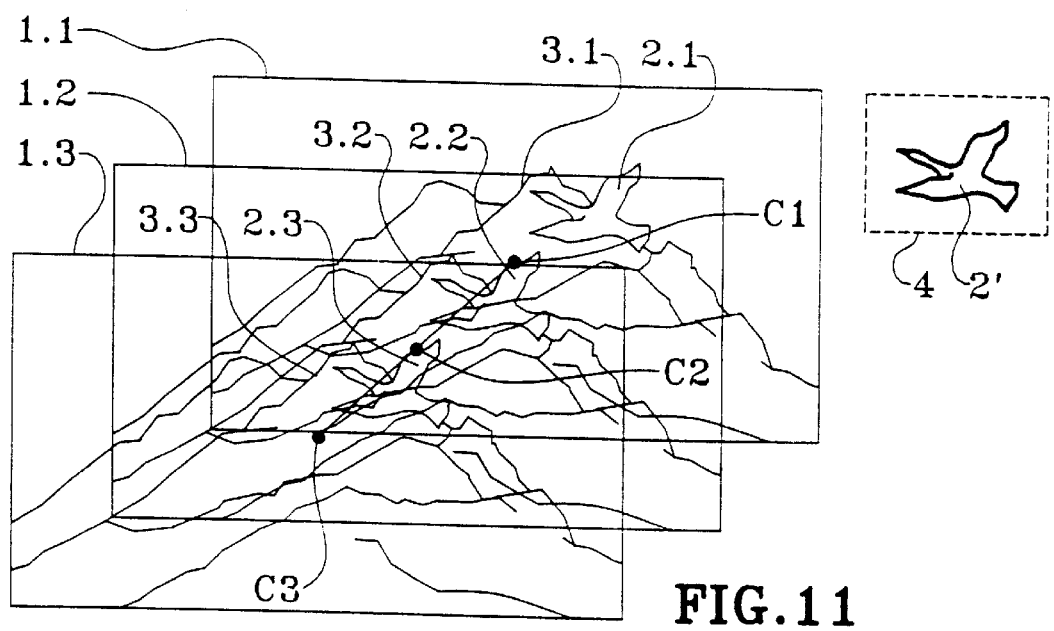
FIG. 11 is a diagrammatic view of a second step in a second implementation of the method of the present invention.

In FIG. 11, the image 1 is separated into complementary colors. For example, the image 1 is separated into a red component 1.1, a green component 1.2, and a blue component 1.3 which are symbolized as three superposed planes in FIGS. 11 to 15. It should be observed that the bird 2 of the image 1 is likewise subjected to separation into complementary color components whereas its copy 2' in the clipboard 4 or in a temporary file is not modified.

Figure 12:
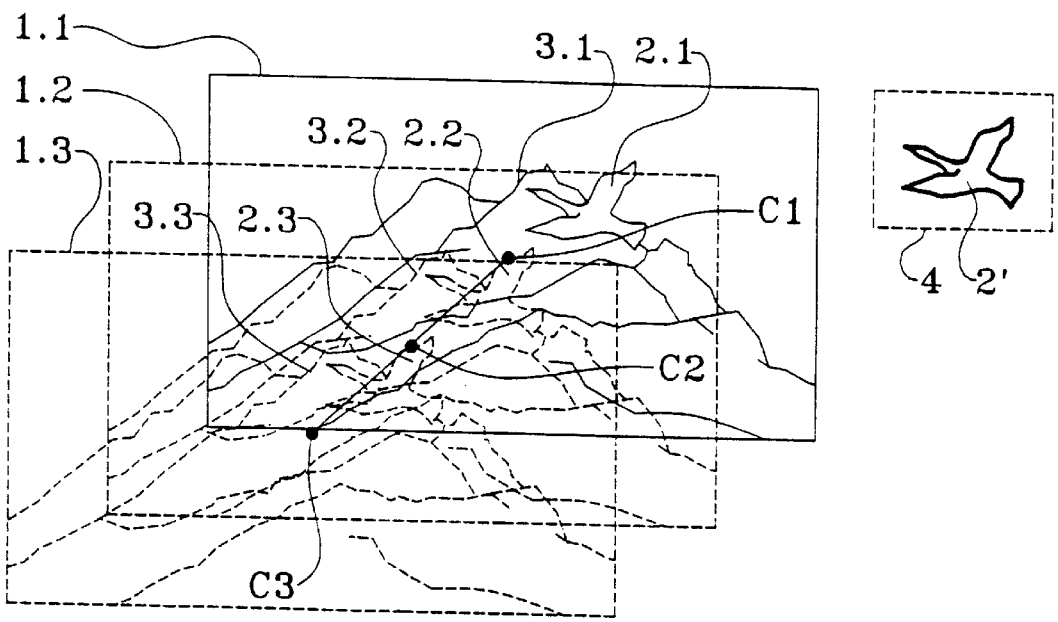
FIG. 12 is a diagrammatic view showing a third step in the second implementation of the method of the present invention.

In FIG. 12, the red component 1.1 has been selected. In bit-map image retouching software, selection enables selected elements to be modified without the remainder of the image being affected.

Figure 13:
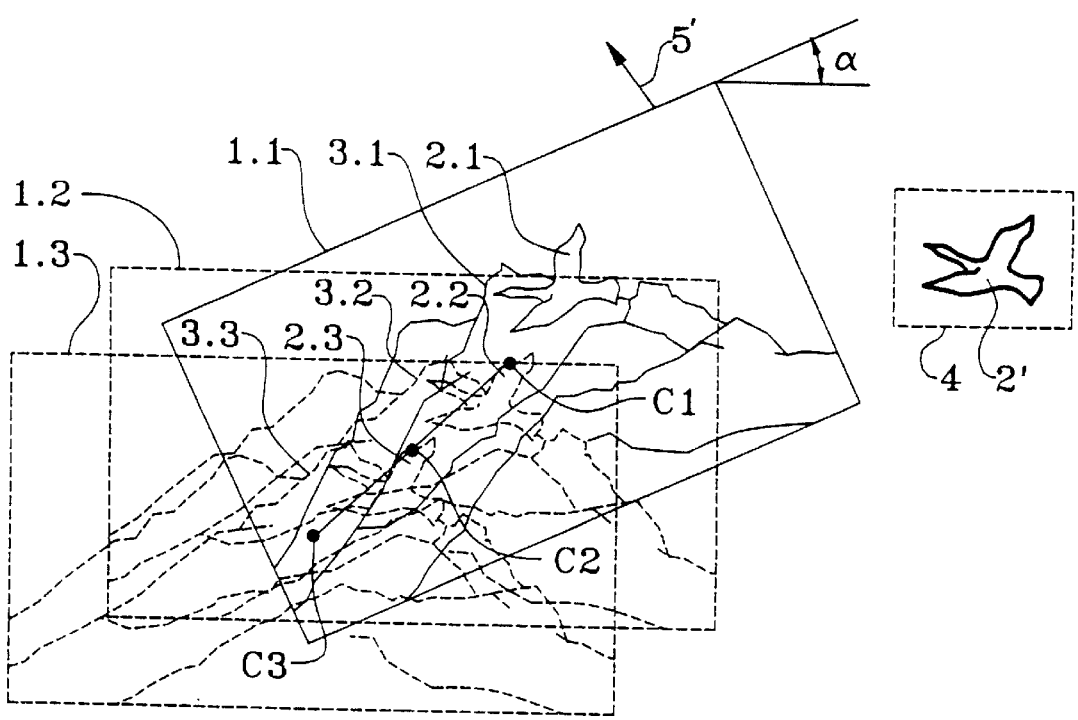
FIG. 13 is a diagrammatic view of a fourth step in the second implementation of the method of the present invention.

In FIG. 13, the component 1.1 of the image 1 has been subjected to counterclockwise rotation through a small angle α, as symbolized by arrow 5'. The rotation must be sufficiently large to be visible in the final image, possibly when using a magnifying glass. Thus, when the stereoscopic image is printed or displayed at low resolution it is necessary to use a larger angle of rotation α. The angle α is preferably less than 2°, e.g. lying in the range 0.001° to 0.8°, preferably equal to 0.02° or 0.04°, e.g. being equal to 0.02° or 0.03°. Keeping the angle of rotation α small makes it possible to minimize its impact on the final stereoscopic image when viewed without using colored spectacles. Advantageously, the center C of the image constitutes the center of rotation. Reference C1 designates the center of the red component 1.1 of the image, reference C2 the center of the green component 1.2 of the image, and reference C3 the center of the blue component 1.3 of the image.

Figure 14:
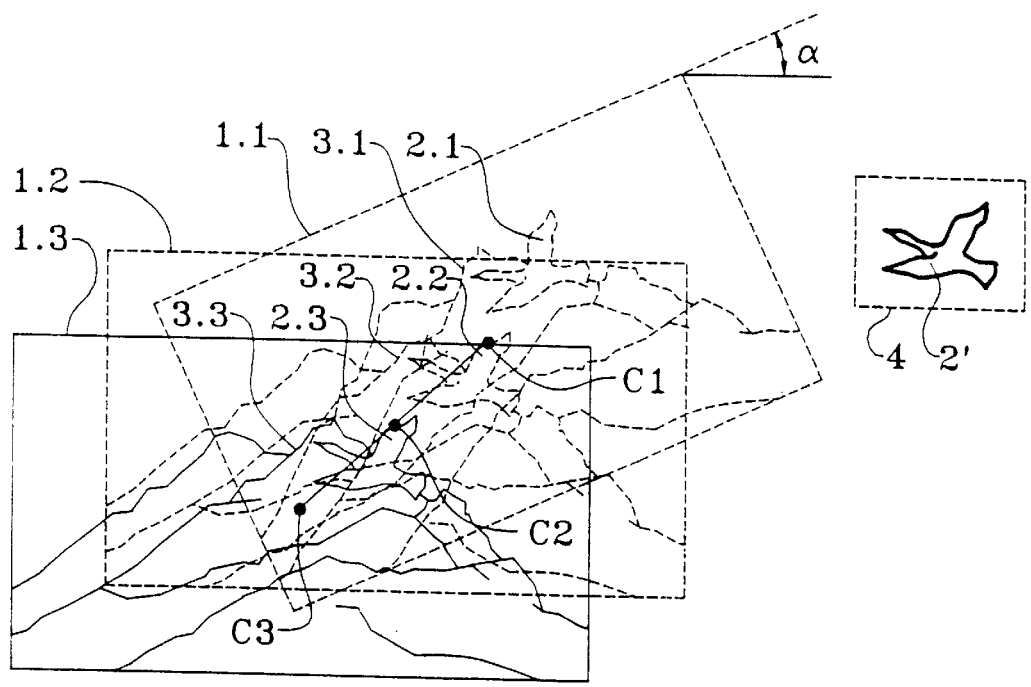
FIG. 14 is a diagrammatic view of a fifth step in the second implementation of the method of the present invention.

In FIG. 14, the red component 1.1 of the image 1 has been deselected and the blue component 1.3 of said image has been selected.

Figure 15:
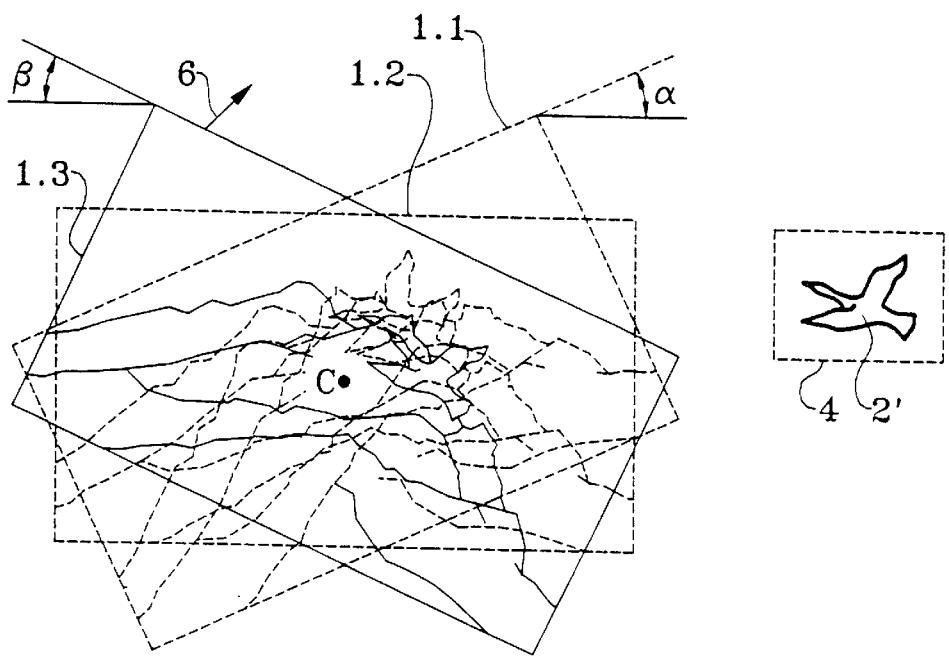
FIG. 15 is a diagrammatic view of a sixth step in the second implementation of the method of the present invention.

In FIG. 15, the blue component 1.3 has been rotated clockwise as symbolized by arrow 6 through an angle β which is advantageously equal to −α, where a is the angle of rotation of the red component 1.1. Nevertheless, implementing rotations of the red and green components 1.1 and 1.3 with angles α and β having absolute values that are not equal does not go beyond the ambit of the present invention.

Figure 16:
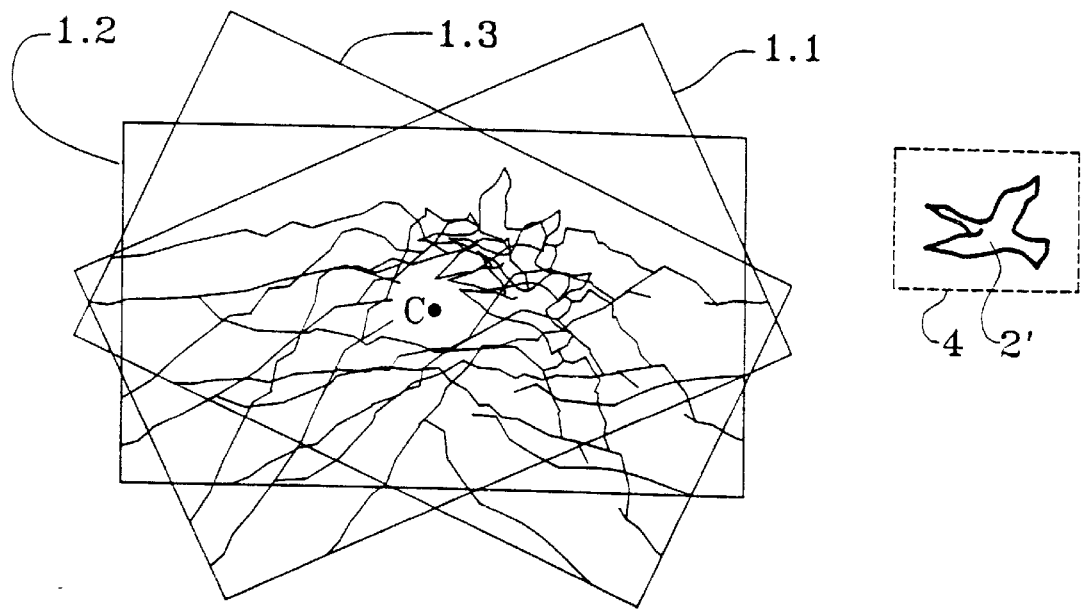
FIG. 16 is a diagrammatic view of a seventh step in the second implementation of the method of the present invention.
Figure 17:
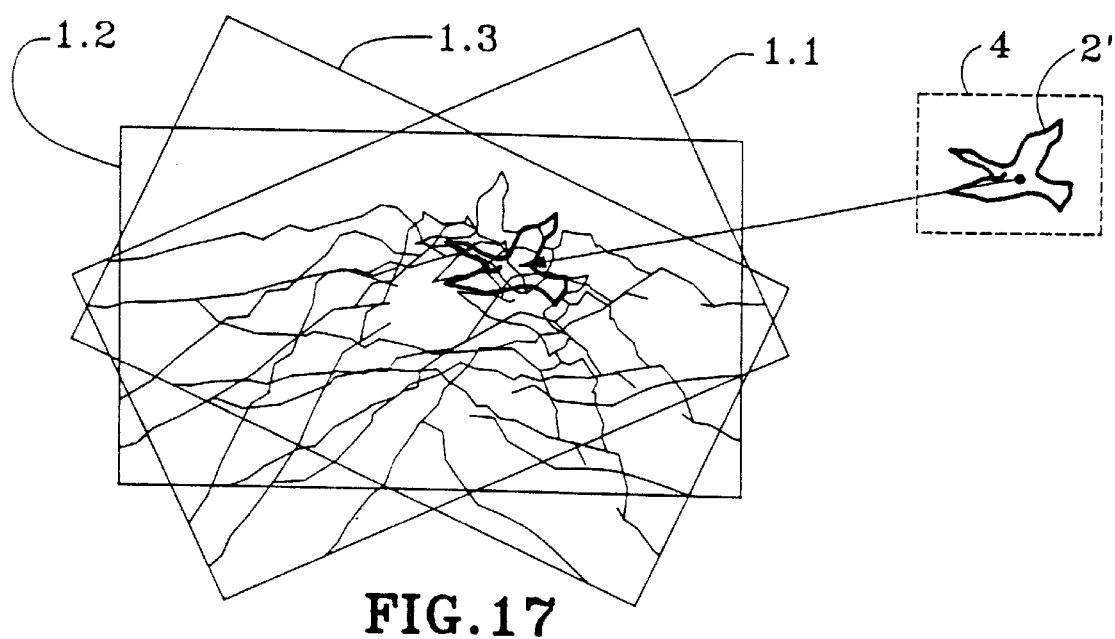
FIG. 17 is a diagrammatic view of an eighth step in the second implementation of the method of the present invention.

In FIG. 16 the blue component 1.3 has been deselected, and it can be seen that the green component 1.2 of the image has remained stationary, whereas the red component 1.1 has been rotated counterclockwise and the blue component 1.3 has been rotated clockwise. The resulting image 1' corresponding to synthesis by additive superposition of the components 1.1, 1.2, and 1.3 is shown in FIG. 17. In this image, the red, green, and blue components 3.1, 3.2, and 3.3 of the mountain 3 are no longer accurately superposed. The same applies the image 2 of the bird whose red, green, and blue components 2.1, 2.2, and 2.3 are not exactly superposed.

The duck 2' is pasted substantially on the location of the green component 2.2 of the image of the duck 2. Pasting is advantageously performed without transparency, i.e. the image 2' completely masks the image 2.2, thereby giving rise to multiple planes that are clearly separate. In a variant, multiple pasting operations are performed that are opaque or that have, for example, 20%, 30%, 40%, 50%, 70% or 90% transparency. By way of example, 2 to 10 successive superposed pasting operations may be performed. The edges of the images are advantageously removed so as to obtain an image that is rectangular.

In a variant, a first image is printed that includes at least a background whose color components have been subjected to the above-specified rotations. The first image may also include images 2' forming a foreground. A second image that has not been subjected to rotation, e.g. a piece of a photographic print, is drawn or physically pasted onto the printed first image. Surprisingly, when using colored spectacles to see a stereoscopic effect, the second image constitutes a foreground that gives the illusion of being situated in front of the background formed by the first image, and the depth effect is striking.

The present invention makes it possible to add depth to pre-existing images or even to make use of a first image for forming the foreground and a second image for forming the background. The foreground may be pasted on the background at the beginning of the method so as to form an image analogous to that shown in FIG. 1, thus making it possible to accentuate the 3D effect. In a variant, it is possible to take a foreground image that has not been subjected to treatment other than blocking out, for example, and to paste it on a background image whose complementary color components, preferably red and blue, have been subjected to the above-described offsets. It should be observed that the directions of rotation described make it possible to use commercially available standardized spectacles having a red filter for the left eye and a blue filter for the right eye. Nevertheless, it will be understood that it would be possible to perform rotations of other combinations of color components, in particular of the image background, without going beyond the ambit of the present invention.

In the implementations described with reference to FIGS. 1 to 17, the image has only two planes, a bird 2 situated in the foreground and a mountain 3 situated in the background. Additional planes may be obtained by applying appropriate treatment to a background on which a treated foreground image can be pasted, such as the image 1" in FIG. 9 or the image of FIG. 16.

In a variant, the foreground-forming image, in particular the bird 2', may be separated into complementary colors with its components 1.1 and 1.3 being rotated in directions opposite to those of the background, thereby emphasizing the three-dimensional effect. Also, by placing other images that have not been subjected to rotation, it is possible to create an intermediate plane between the background plane and the foreground plane.

Similarly, the impression of depth can be reinforced by making the background plane of the image slightly fuzzy. Under such circumstances, the foreground plane is quite sharp whereas the background plane corresponds to the "nearly sharp" function available in some image retouching graphics software.

Rotation of the red and blue components 1.1 and 1.3 of the image can be accompanied by shifting of said components.

For example, shifting of the red component 1.1 may take place after the selection of FIG. 12 and before or after the rotation shown in FIG. 13. Similarly, a horizontal shift in the opposite direction of the blue component 1.3 is performed before or after the rotation of FIG. 15. Nevertheless, the translation shifts need not necessarily be applied to the same color components as those that have been subjected to rotation. The shifts may lie in the range, for example, 0.25 to 10 pixels, and advantageously lie in the range 0.25 to 2 pixels. Small amplitude shifts, like small angle rotations, possibly in combination, make looking at a plane image more agreeable (i.e. without depth effect and without colored spectacles).

The method of the present invention can be implemented on most graphics programs for retouching images or for editing images in bit-map mode that enable the image to be separated into complementary colors. Selection, and in particular the blocking out involved in going from FIG. 1 to FIG. 2 can be performed manually or it may be assisted by automatic selection functions, e.g. functions such as "magic wand", "lasso", or "airbrush" that are available in numerous software packages.

In a variant, the method of the invention can be implemented using special software including a graphics editor, with the help of an additional filter or module for graphics editing or for retouching, or with the help of a macro-command that is performed after an image has been loaded and its foreground copied into the clipboard.

Surprisingly, it should be observed that stereoscopic images of the present invention as obtained by rotating the red and blue components 1.1 and 1.3 can be synthesized with subtractive three-color printing using yellow, magenta, and cyan (YMC) inks or using four-color printing with yellow, magenta, cyan, and black inks (YMCK). Images of the present invention can thus be displayed on computer monitors and on television receivers, and they can be printed on office color printers and on graphics arts printers, they can be silk-screen printed, printed using conventional printing methods, etc. . . .

Naturally, the present invention is not limited to non-moving images and it is equally applicable to sequences of images that reproduce an effect of movement and/or transition, e.g. such as slide shows, video programs and motion pictures, video games, etc.

Each image of the sequence of images, and in particular of a motion picture, can be treated manually using the above-described method. However, it may be advantageous to treat each shot or sequence of shots automatically. Once the film has been digitized, an operator informs the computer system of the locations of the foreground and of the background, and also of any intermediate planes. On the basis thereof, the system performs the necessary blocking out and selection and also the shifts and/or rotations of the various color components of the image. The modified image is stored for subsequent use in digital form or it is transferred, e.g. onto a silver-based medium or onto analog video tapes. The system loads in the following image and identifies the foreground and the background. Such selection may advantageously be performed by artificial intelligence algorithms, and in particular by an expert system. For example, the foreground and the background may be selected by applying rules of the type: "foreground and background change little from one image to the next"; "the color of the foreground varies little from one image to the next". In a variant, algorithms may be used for selecting image portions that are implemented by computer programs designed to colorize black-and-white films.

It should be observed that imparting a three-dimensional effect is particularly easy with cartoons having uniform colors.

In a variant, it is possible to generate stereoscopic films of the invention directly by directly applying the shifts and/or rotations to the color components of an image while a synthesized image is being computed, e.g. the elementary images of a cartoon.

In a first variant of interactive computer programs, in particular video games, stereoscopic image sequences are stored on a medium, e.g. a digital optical disk, in particular disks of the kind obtained by pressing (CD-ROMs). The actions of the player cause sequences to be selected one after another from the available sequences stored on the media. In a variant, the displayed images are generated as the game progresses as a function of information contained on the medium, in particular concerning the scenario and the graphics relating to the scenery and the various characters, and also as a function of the actions of the player. The shifts and/or rotations of the color components 1.1 and 1.3 of the image are performed in real time by the software and by hard-wired functions, e.g. in the graphics card of the computer system.

The present invention relates to making stationary and/or animated stereoscopic images.

The present invention is mainly applicable to printing images on a surface, in particular post cards, albums, logos, particularly for packaging, posters, slides, motion pictures on a silver-based medium, on a video medium, etc., to the computer industry, and in particular to graphics editors and to image retouching programs, to digital video, and to interactive computer programs, in particular to video games.

What is claimed is:

1. A method of transforming images into stereoscopic images, the method comprising the following steps:

a) defining pixels forming a background;

b) defining pixels forming a foreground;

c) temporarily saving the pixels that form a foreground;

d) separating an image including at least background-forming pixels into complementary color components;

e) displacing at least one of the color components relative to the other components; said displacing of at least one of the color components comprising rotating at least one of the color components relative to the other components through a non-zero angle α of less than 2°, and f) superposing the temporarily saved foreground-forming images on the image having at least one of its color components subjected to displacement.

2. A method according to claim 1, characterized in that digitized images are treated and the angle α lies in the range 0.001° to 0.8°.

3. A method according to claim 2, wherein the angle α lies in the range 0.001° to 0.4°.

4. A method according to any preceding claim, characterized in that the relative displacement of colors (1.1, 1.2, 1.3) includes translation of at least one of the color components (1.3) relative to the other components (1.1, 1.2).

5. A method according to claim 4, characterized in that digitized images are treated, and in that the relative translation of the color components (1.1, 1.2, 1.3) is horizontal or substantially horizontal, and has an amplitude lying in the range 0.25 pixels to 15 pixels.

6. A method according to claim 5, wherein the horizontal or substantially horizontal translation lies in the range 0.25 to 3 pixels.

7. A method according to any preceding claim, characterized in that it makes use of a computer system, and in that step c) consists in selecting and copying foreground-forming pixels (2) in particular into the clipboard or a file (4).

8. A method according to any preceding claim characterized in that it includes a step of cropping the ends of the image.

9. A method according to any preceding claim, characterized in that step d) of separating the image including the background into complementary color components comprises separation into red, green, and blue components (1.1, 1.2, 1.3).

10. A method according to claim 9, characterized in that rotation of the same amplitude (α, β) is performed in opposite directions on the red and blue components (1.1, 1.3) of the image including the background.

11. A method according to claim 8, characterized in that same amplitude translation (D1, D2) in opposite directions is performed on the red and blue components (1.1, 1.3) of the image including the background.

12. A method of transforming a motion picture into a stereoscopic motion picture, characterized in that it includes the steps of acquiring the images of the motion picture and steps of transforming the images into stereoscopic images according to any preceding claim.

13. A method according to claim 12, characterized in that it includes a step of automatically detecting foregrounds or backgrounds in the images to be transformed.

14. An article of manufacture comprising a display medium and a stereoscopic image provided thereon, said stereoscopic image being viewable as a three-dimensional image when viewed through colored spectacles and being viewable as a two-dimensional image without colored spectacles, and said image being obtained by the method according to claim 1.

15. An image according to claim 12, characterized in that it is synthesized by four-color subtractive printing using yellow, cyan, magenta, and black inks.

16. An article of manufacture according to claim 14, wherein said display medium is selected from the group consisting of a surface, a video medium, a computer monitor, and a television receiver.

* * * * *

UNITED STATES PATENT AND TRADEMARK OFFICE
CERTIFICATE OF CORRECTION

PATENT NO. : 6,175,371 B1
DATED : January 16, 2001
INVENTOR(S) : Philippe Schoulz, Keith MacDonald It is certified that error appears in the above-identified patent and that said Letters Patent is hereby corrected as shown below:

In the References Cited, Other Publications, line 3, after "Rosemont" insert -- Illinois, --

(54) In the title, "PROCESS FOR TRANSFORMING IMAGES INTO STEREOSCOPIC IMAGES, IMAGES AND IMAGE SERIES OBTAINED BY THIS PROCESS" should read -- METHOD OF TRANSFORMING IMAGES INTO STEREOSCOPIC IMAGES, AND IMAGES AND IMAGE SEQUENCES OBTAINED BY SAID METHOD --;

column 11, line 25, "Characterized in that" should read -- wherein --;

line 30, "any preceding claim" should read -- claim 1 --;

lines 30-31, "characterized in that" should read -- wherein --;

line 34, "characterized in that" should read -- wherein --;

line 35, "in that" should read -- wherein --;

line 42, "any preceding claim" should read -- claim 1 --;

lines 42-43, "characterized in that it makes" should read -- making --;

line 43, "in that" should read -- wherein --;

column 12, line 3, "any preceding claim" should read -- claim 1 --;

lines 3-4, "characterized in that it includes" should read -- including --;

line 6, "any preceding claim" should read -- claim 1 --;

lines 6-7, "characterized in that" should read -- wherein --;

line 11, "characterized in that" should read -- wherein --;

line 15, "claim 8" should read -- claim 9 --;

line 15, "characterized in that" should read -- wherein --;

line 20, "characterized in that it includes" should read -- the method including --;

UNITED STATES PATENT AND TRADEMARK OFFICE
CERTIFICATE OF CORRECTION

PATENT NO. : 6,175,371 B1
DATED : January 16, 2001
INVENTOR(S) : Philippe Schoulz, Keith MacDonald It is certified that error appears in the above-identified patent and that said Letters Patent is hereby corrected as shown below:

Continued:

line 23, "any preceding claim" should read -- claim 1 --;

lines 24-25, "characterized in that it includes" should read -- including --;

line 34, "image" should read -- article --;

line 34, "claim 12" should read -- claim 14 --;

lines 34-35, cancel "characterized in that it is".

Signed and Sealed this

Fifteenth Day of May, 2001

*Attest:*

NICHOLAS P. GODICI

*Attesting Officer*   *Acting Director of the United States Patent and Trademark Office*